July 14, 1936.    G. R. THEW    2,047,498
HAND CULTIVATOR
Filed April 22, 1935
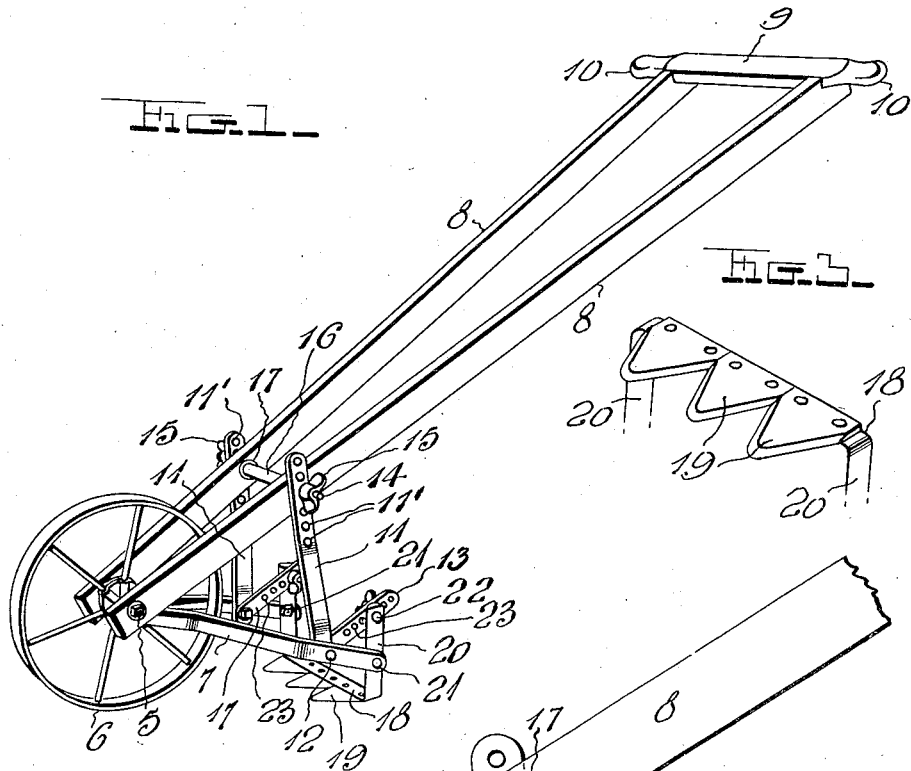
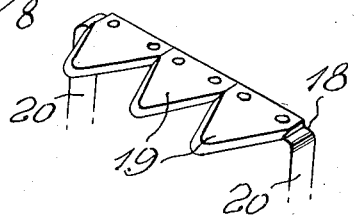
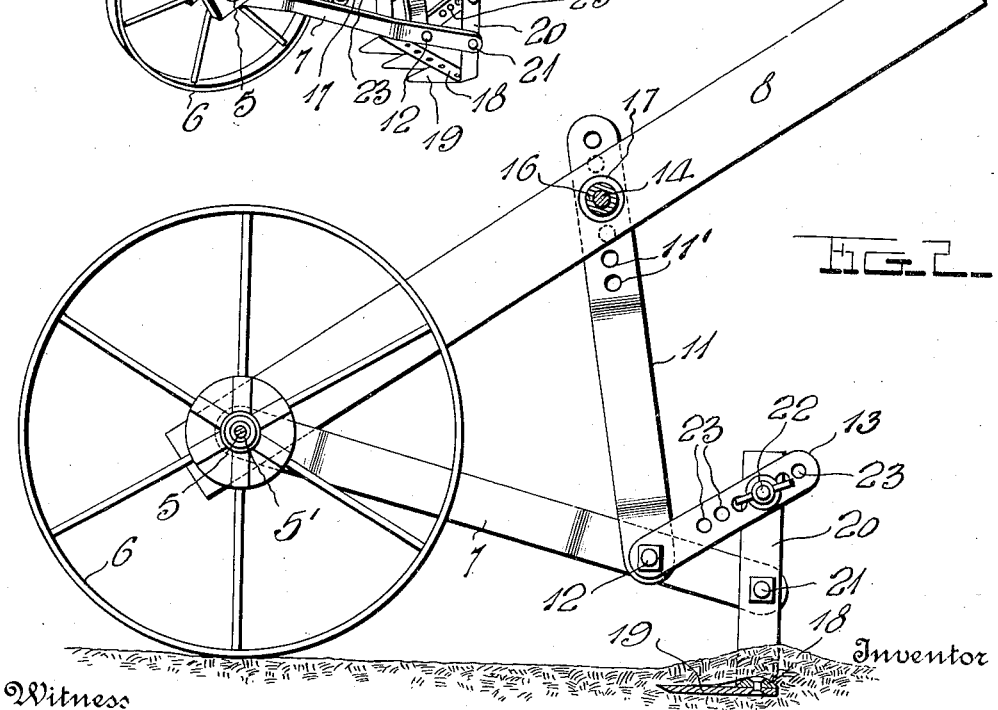
Witness
H. Woodard
Inventor
GERALD R. THEW
By
Attorney Patented July 14, 1936

2,047,498

UNITED STATES PATENT OFFICE 2,047,498

HAND CULTIVATOR

Gerald R. Thew, Hopewell Junction, N. Y.

Application April 22, 1935, Serial No. 17,717

2 Claims. (Cl. 97—59)

The invention aims primarily to provide an exceptionally simple, yet an efficient and durable garden cultivator which may be easily pushed by hand to simultaneously cut off weeds and the like below the surface of the ground and reduce the top soil to a high state of fineness.

Another object of the invention is to provide for quick and easy adjustments for depth of cut and height of handles.

A still further aim is to provide a novel structure which may be easily and inexpensively manufactured and sold at small cost.

With the foregoing in view, the invention resides in the novel subject matter hereinafter described and claimed, description being accomplished by reference to the accompanying drawing.

Fig. 1 is a perspective view of the complete cultivator.

Fig. 2 is an enlarged vertical longitudinal section.

Fig. 3 is a fragmentary inverted perspective view showing the toothed cutter.

A specific construction which has proven advantageous from numerous standpoints, has been illustrated in the drawings and will be specifically described, with the understanding, however, that minor variations may be made within the scope of the invention as claimed.

A suitable axle 5 is provided with a single supporting wheel 6. Two rearwardly diverging draw-bars 7 are secured at their front ends upon the axle 5, being spaced apart by the usual sleeve 5' within the hub of the wheel. Two handles 8 which incline rearwardly are also secured at their front ends upon the axle 5, this axle being in the form of a bolt with suitable washers so that it may be tightened to rigidly hold the front ends of the handles and the drawbars 7 in fixed relation, binding of said draw-bars against the wheel hub, however, being prevented by the above-mentioned sleeve 5'. The rear ends of the handles 8 may be provided with a transverse push-bar 9 having hand-grips 10 or may be provided with other conventional form of hand-grips.

Two handle-supporting-and-adjusting bars 11 are secured at their lower ends to the draw-bars 7 by means of bolts 12 which are spaced forwardly from the rear ends of said draw-bars. The front ends of rearwardly inclined adjusting links 13, for a purpose to appear, are secured at their front ends by these same bolts 12. The upper portions of the bars 11 are formed with spaced openings 11' engaged by a through-bolt 14 which passes through the handles 8 and is provided at its ends with thumb-nuts 15. A spacing sleeve 16 and washers 17 surround the bolt 14 between the handles 8 to insure that tightening of the nuts 15 shall tightly clamp the upper ends of the bars 11 instead of merely springing the handles 8 inwardly, and said sleeve and washers also assist in imparting rigidity to the entire structure.

A transverse cutter, preferably in the form of a metal bar 18 having conventional mower teeth 19 riveted to its lower side, is disposed under the rear ends of the draw-bars 7, said cutter being provided with upwardly projecting arms 20 at its ends. The intermediate portions of these arms 20 are connected by pivot bolts 21 with the rear extremities of the draw-bars 7, and adjusting bolts 22 connect the upper ends of said arms with the adjusting links 13, said links having spaced openings 23 through any of which the bolts 22 may be passed.

By removing the bolts 22 and swinging the arms 20 about the pivot bolts 21, and then replacing said bolts in the proper openings, the cultivator may be easily adjusted for different depths of cut. Adjusting the upper ends of the arms 20 forwardly increases the depth of cut and adjusting them rearwardly decreases the same. The handles 8 may be adjusted to the most convenient height due to the adjusting means connecting these handles with the bars 11.

It will be seen from the above that a simple and inexpensive construction has been provided, yet one which will operate easily and efficiently and will be long-lived. When the implement is inverted as shown in Fig. 3, the cutting edges of the teeth 19 may be easily sharpened or the entire cutter may be removed and ground if desired. These cutting edges exert a shearing cut on all weeds and the like and thus easily cut the same below the surface of the ground, as well as assisting in fining the earth. The earth must pass rearwardly over the teeth 19 and the bar 18, and during such passage is reduced to a high state of fineness. When the teeth are worn out from long use, it is an easy matter to remove them from the bar 18 and rivet on new teeth. The upper side of the bar 18 is preferably convex from front to rear as shown in Fig. 2, to prevent earth and weeds from catching thereon and to cause it to first elevate and then lower the earth, assisting in effectively breaking it up to a fine state.

While the details disclosed are preferred, attention is again invited to the possibility of making minor variations within the scope of the invention as claimed.

I claim:—

1. A hand cultivator comprising a wheel-and-handle-equipped frame, a transverse bar having upstanding arms at its ends secured to said frame, and sharp-edged V-shaped weed-cutting teeth secured against the lower side of said bar and projecting forwardly therefrom, the upper side of said bar being convex from front to rear to prevent weeds and earth from catching thereon and to first elevate and then lower the earth passing over said bar, assisting in breaking this earth to a high state of fineness.

2. In a hand-pushed, wheeled cultivator, the combination of a frame structure having a handle, a supporting wheel mounted on said structure, a bar having a flat bottom and upstanding arms at its ends, said bar being disposed transversely beneath the frame structure and spaced rearwardly from said wheel, flat sharp-edged, V-shaped weed-cutting teeth secured against the lower side of said bar and projecting forwardly therefrom, the upper side of said bar being convex from front to rear to prevent weeds and earth from catching thereon and to first elevate and then lower the earth passing over said bar to break up the same, and means for rigidly securing the arms of said bar to said frame structure in different fixed angular positions with respect to said frame structure to vary the depth of cut made by the teeth.

GERALD R. THEW.